(12) United States Patent
Votteler et al.

(10) Patent No.: US 7,037,401 B2
(45) Date of Patent: May 2, 2006

(54) METHOD FOR PRODUCING VENEERED COMPRESSED PARTS

(75) Inventors: Dietmar Votteler, Korntal-Münchingen (DE); Siegfried Fabriz, Pleidelsheim (DE); Jörg Sentko, Hemmingen (DE)

(73) Assignee: Votteler Lackfabrik GmbH & Co. KG, (DE)

( * ) Notice: Subject to any disclaimer, the term of this patent is extended or adjusted under 35 U.S.C. 154(b) by 223 days.

(21) Appl. No.: 10/332,921

(22) PCT Filed: Apr. 26, 2001

(86) PCT No.: PCT/EP01/04701

§ 371 (c)(1),
(2), (4) Date: Apr. 16, 2003

(87) PCT Pub. No.: WO02/07938

PCT Pub. Date: Jan. 31, 2002

(65) Prior Publication Data

US 2003/0150548 A1    Aug. 14, 2003

(30) Foreign Application Priority Data

Jul. 11, 2000    (DE) ............................... 100 33 528

(51) Int. Cl.
*B32B 31/00* (2006.01)
(52) U.S. Cl. ..................... 156/278; 156/245; 156/307.7
(58) Field of Classification Search ................. 156/61, 156/245, 278, 307.5, 307.7; 428/106, 151
See application file for complete search history.

(56) References Cited

U.S. PATENT DOCUMENTS 3,701,706 A * 10/1972 Giddings et al. ......... 156/307.5
4,933,428 A * 6/1990 Piepho et al. ............... 528/272

FOREIGN PATENT DOCUMENTS

| DE | P 32 43 497.9 | 7/1983 |
| DE | P 42 06 021.4 | 9/1993 |
| DE | 197 53 243 | 7/1999 |
| EP | 553407 A1 * | 8/1993 |
| GB | 2 306 389 | 6/1996 |
| JP | 03110102 A * | 5/1991 |
| JP | 05309613 A * | 11/1993 |

OTHER PUBLICATIONS

English abstract DE 19753243.*
Machine translation DE 19753243.*
English abstract JP 05309613.*
English abstract DE 4206021.*
Machine translation DE 4206021.*
English abstract EP 553407.*
Machine translation EP 553407.*
English abstract JP 03110102.*

* cited by examiner

*Primary Examiner*—Jeff H. Aftergut
*Assistant Examiner*—John L. Goff
(74) *Attorney, Agent, or Firm*—Akerman Senterfitt; Stephan A. Pendorf

(57) ABSTRACT

A method for producing veneered compressed parts, wherein a carrier, an intermediate sheet of veneer and a cover sheet of veneer are glued together in a molding press as to form a unfinished molded part. The cover sheets of veneer and optionally the intermediate sheets of veneer are thoroughly dyed in an aqueous dye bath before executing the molding process and then dried while the surface of the finished molded part is lacquered. A continuous layer of a pasty, hardenable impregnating agent is applied on one side of the thoroughly dyed cover sheet of veneer and the layer of impregnating agent is substantially prehardened while preserving flexibility. The cover sheets of veneer are stabilized mechanically as well as their color fastness by the layer of impregnating agent.

23 Claims, No Drawings

METHOD FOR PRODUCING VENEERED COMPRESSED PARTS

CROSS REFERENCE TO RELATED APPLICATION

This application is a national stage of PCT/EP01/04701 filed Apr. 26, 2001 and based upon DE 100 33 528.4 filed Jul. 11, 2000 under the International Convention.

BACKGROUND OF THE INVENTION

1. Field of the Invention

The invention concerns a process for production of veneered compressed parts, in which a carrier, at least one intermediate veneer and a cover sheet of veneer are glued together under the exercise of a pressure of more than 200 N/cm$^2$ at a temperature of more than 120° C. in a mold press to form a veneer preform, wherein first the veneer cover sheet and in certain cases the intermediate veneer are dyed in an aqueous dye bath at an overpressure at a temperature of 105° C. to 115° C. and then dried, and wherein the veneer preform is lacquered or painted on its free surface.

2. Description of the Related Art

In the manufacture of veneered pressed parts of this type conventionally less valuable wood is covered with a cover sheet or veneer of fine wood. In order to be able to satisfy a high quality standard in the finished mold-press parts even in the case of relatively low veneer qualities, it is known (DE-C 4206021), that the covered veneer and in certain cases the intermediate veneer are thoroughly dyed batch-wise in an aqueous dye bath and subsequently dried, and that a cover sheet of veneer pretreated in this manner as well as the intermediate veneer are joined with each other in a mold press. In the known processes the dye bath additionally contains an aqueous soluble or dispersible binder resin completely activatable at temperatures above 115° C., with which the veneer is treated during the dying process. The treatment of the cover and the intermediate veneer with the binder agent has the task of fixing the dyes and anchoring them in the wood, of improving the color trueness and water resistance as well as reinforcing the wood. During the dying process and the subsequent storage the binder does not completely harden. The final hardening occurs only under the influence of heat and pressure in the course of the mold pressing.

In practice the known process have been associated with recurring difficulties in keeping the binder agent additive dispersed in the dye bath. Frequently precipitation occurs, which can primarily be traced back to thermal reactions in the employed binder agent. Further, it has until now been necessary to join the veneers to each other by the interposition of dry glue sheets, since the veneers, in particular the cover sheet of veneer in the case of a one-sided coating with a wet adhesive, bow or warp and deform upon the uptake of moisture.

SUMMARY OF THE INVENTION

Beginning therewith it is the task of the present invention to improve the known processes of the above-described state of the art such that the veneer pretreatment process is simplified, the veneer stabilization is improved and the molding process is simplified.

The solution of this is task is proposed in accordance with the overall combination of characteristics set forth in patent claim 1. Advantageous embodiments and further developments of the invention can be seen from the dependent claims.

The inventive solution is based primarily upon the idea, that the problematic binder agent in the dye bath in the known processes is dispensible, when the dyed cover sheet of veneer is subsequently treated with a suitable impregnation material, which results in a color stabilization and a structural stabilization of the cover veneer. In order to accomplish this, it is proposed in accordance with the invention that on the dyed cover sheet of veneer, a coherent layer of a viscous, curable or hardenable impregnation material is applied on one side, that the impregnation material layer is subsequently precured or prehardened under maintenance of its flexibility, and that the impregnation material layer is completely cured or hardened during the mold press process at elevated temperature.

In accordance with a preferred embodiment of the invention it is envisioned that the impregnation material is roll-coated upon an outer surface of the dyed cover veneer, preferably in an amount of 30 to 60 g/m$^2$ and that it is prehardened by UV light radiation. The cover sheet of veneer with the prehardened impregnation material layer is now as before flexible, so that it can be subjected to a mold press process. The impregnation material is not completely hardened until the form press process, namely by a hardener activatable at temperature above 120° C.

It has been found to be particularly advantageous to employ as the impregnation material a mixture comprising
70 to 95 weight percent of a mixture of unsatured polyester resins of various molecular weights,
2 to 8 weight percent of a photoinitiator,
0.1 to 2 weight percent of an organic peroxide,
0.1 to 3 weight percent of a thixotropic material
and balance additives.

Preferably polyester resins based on allylether are employed.

As photoinitiator, a UV initiator can be employed, in particular selected from the group of acylphosphinoxides, ketals, hydroxyketones, aminoketones or mixtures thereof.

As thixotropic agent, SiO$_2$ is preferably employed.

In order to improve the color palate and to be more amenable to color selection based on fashion trends, the cover sheet of veneer be bleached in an aqueous bleach bath, either oxidative or reductive, prior to the coloring process, preferably with an over pressure at a temperature of 105° C. to 115° C. The bleach intensity can therein be controlled depending upon the amount of the desired final color, and thus can be done by selecting the bleaching agent and bleach process (oxidative or reductive). As bleach agent in the aqueous bleach bath one can consider hydrogen peroxide in a concentration of 0.5 to 5 weight percent. Further one could consider also sodium or calcium hypochlorite, sodium peroxide or sodium bisulphate, and this depending upon which veneer wood is being treated, which bleach effect and which color shade is to be achieved.

In the intermediate layer a bleaching prior to the dying is basically not necessary, since here there is no concern with light colors or lightness. The intermediate veneer is more conventionally colored-through with a dark, preferably black dye, so that following edge-cutting or window cutouts a colored post-painting can be dispensed with.

The cover veneers are so mechanically stabilized by the mechanical impregnation layer, that they can be provided with a wet adhesive layer on the side opposite to the impregnated side without any danger of deformation. The thicker intermediate veneer also can be provided on one side with a wet adhesive layer. Thereby, the wet adhesive layer is preferably roller coated or coated upon the veneer surface in an amount of 30 to 40 g/m² and subsequently dried at room temperature at an elevated temperature up to 40° C. The wet adhesive layer is so selected, that it melts in the course of the mold press process at a temperature above 70° C. and is activatable at temperature above 120° C. Preferably, a wet adhesive is employed which contains at least one compound selected from the group consisting of heat activatable polyacrylate, vinyl resin or polyurethane combinations. In order to avoid a splintering of the mold press part in the case of a crash, at least one metal sheet, preferably of aluminum, is interposed between the two adjacent veneer layers prior to the mold press process and adhered thereto during the mold press process. In order to insure a sufficient bonding of the veneers parts to the metal sheet, the wet adhesive mixture further includes additives on the basis of phenolic resin or resorcinol resin.

In order to protect the outer surface of the cover sheet of veneer during the press process and during transport, they are provided on the side of the impregnation layer with a dissolvable protective sheet preferably of polypropylene, which can be removed following the mold press process.

The impregnation here replaces the otherwise conventional primer coat on the finished mold press part, so that the mold press part, in certain cases subsequent to a preliminary touch-up, can be provided with at least one lacquer or paint layer on the side of its impregnation layer.

ILLUSTRATIVE EXAMPLES

Example 1

Bleaching

In an autoclave an aqueous bleach solution having 30 g/l 35% hydrogen peroxide is introduced. This bleach solution is next heated to 80 to 90° C. Then a batch of approximately 40 fine wood veneers are introduced into the autoclave, such that the veneers are completely washed over by the bleach solution. After closing the autoclave the bleach solution is heated to 105° C. and maintained at this temperature for approximately 1 hour with appropriate over-pressurization. After the subsequent cooling of the bleach solution to a temperature below 100° C. and ventilation of the autoclave the fine wood veneers are removed and dried.

Example 2

Dying the Cover Veneer 8 kg of a commercially available water-soluble stain (positive effect stain) were stirred into 100 l water at a temperature of 80° C. together with additives until complete solution. The dye bath resulting thereby was introduced into an autoclave. In this dye bath a batch of approximately 40 bleached fine wood veneers were dipped such that the veneers were completely washed over by the dye bath.

With closed autoclave the dye bath was subsequently heated to 100° C. and maintained at this temperature for approximately 1 hour with appropriate over-pressurization. Thereby the fine wood veneers were evenly dyed throughout. After a cooling and ventilation of the autoclave the thoroughly dyed veneers were removed from the dye bath and dried.

Example 3

Impregnation of the Veneer Cover Sheets

The thoroughly dyed fine wood veneers were introduced to a roller group via a continuous conveyor belt such that a viscous binder was applied via the roller gap upon the broad surface of the veneer cover sheets as they passed through in an amount of 40 to 60 g/m². The impregnation material thereby contains a mixture of 85 weight percent polyester resin with various molecular weights on the basis of allylether, 1% silicon dioxide as thixotrophic agent, 4 weight percent acylphosphinoxide as UV initiator, as well approximately 1 weight percent of an organic peroxide for the final hardening, as well as additives comprising the balance.

Subsequent to the roller impregnation the cover veneers were conveyed by a UV lamp via a conveyor belt, whereby a prehardening of the impregnation agent occurs via the UV initiator. On the basis of the prehardening the flexibility of the cover sheet of veneer remained intact for the later mold press process. The sheets are dry and thus can be stacked.

Example 4

Coloring the Intermediate Veneer

Untreated veneers of red birch were heated in an autoclave to 105° C. with black dye material (reactive azo-metal complex dye) as well as a binder based on urea resin and maintained for approximately 1 hour with appropriate over-pressurization at this temperature. The thoroughly dyed veneers are removed and dried following cleaning and ventilation of the autoclave.

Example 5

Gluing

The cover veneers are conveyed via a conveyor belt to a group of rollers, via which they are provided on their side opposite the impregnated layer with a wet adhesive layer on the basis of thermal reactive polyacrylate, vinyl resin or polyurethane combinations in an amount of 30 to 40 g/m². Likewise, a wet adhesive layer is rolled onto one of the broad surfaces of the intermediate veneer as it passes through. The wet adhesive layer on the veneers is dried at an elevated temperature of up to 40° C., so that the veneers can be stacked.

Example 6

Mold Pressing

A sheet-shaped carrier of sheet-aluminum, plastic or plywood, a group of black dyed intermediate veneers of red birch and a fine wood veneer dyed to a wood color are, following appropriate cutting via a cross cutter, stacked on each other with interposition of at least one aluminum sheet, are provided with a protective sheet of thermal resistant plastic and are deformed in a mold press at a temperature of approximately 150° C. and a press pressure of 300 N/cm. The press pressure and the temperature are maintained for 3 minutes. Thereby the adhesive layers are hardened on the veneers. Besides this, a final hardening of the impregnation layer is activated via the organic peroxide. Next, the protective layer is pulled off of the veneer surface. Further, the veneer surface of the thus produced raw mold piece is puttied or mordanted, ground and provided with multiple paint layers, for example—of the polyester type.

In summary the following can be concluded: The invention relates to a method for producing veneered compressed parts, wherein a carrier preferably consisting of aluminum, an intermediate sheet of veneer and a cover sheet of veneer are glued together by exerting a pressure of over 200 M/cm² at a temperature higher than 120° C. in a molding press as to form an unfinished molded part. The cover sheets of veneer and optionally the intermediate sheets of veneer are thoroughly dyed at an overpressure in an aqueous dye bath at a temperature ranging between 105 and 115° C. before executing the molding process and then dried while the surface of the finished molded part is lacquered. The production of the compressed part is substantially simplified when a continuous layer of a pasty, hardenable impregnating agent is applied on one side of the thoroughly dyed cover sheet of veneer and when the layer of impregnating agent is substantially prehardened while preserving flexibility. Post-hardening of the impregnating agent is carried out during the compression molding process at increased temperature. The cover sheets of veneer are stabilized mechanically as well as their color fastness by the layer of impregnating agent.

What is claimed is:

1. A process for production of veneered compressed parts, in which a carrier sheet, at least an intermediate veneer sheet and a cover sheet of veneer are adhered to each other under the exercise of a pressure of greater than 200 N/cm² at a temperature of greater than 120° C. to form a preform part, wherein the cover sheet of veneer and optionally the intermediate veneer sheet are prior to this subjected to an aqueous dye bath with over-pressure at a temperature of 105 to 115° C., are thoroughly dyed and then dried, and wherein the molded preform part is lacquered on its exposed surface, wherein on the thoroughly dyed cover sheet of veneer on one side a continuous layer of a viscous, curable impregnation agent is applied, wherein the impregnation agent layer is subsequently precured with maintenance of flexibility, and wherein the cover sheet of veneer is provided on its side opposite to the impregnation agent layer with a wet glue layer and wherein the impregnation agent layer during the compression molding process is finally cured at an elevated temperature by a curing agent.

2. A process according to claim 1, wherein the impregnation agent is applied upon the surface of the thoroughly dyed cover sheet of veneer with a roller, forming a coating.

3. A process according to claim 1, wherein the impregnation agent is applied onto the cover sheet of veneer in an amount of 30 to 60 g/m².

4. A process according to claim 1, wherein the impregnation agent is pre-cured by UV light radiation.

5. A process according to claim 1, wherein the impregnation agent is finally cured by a curing agent at a temperature above 120° C.

6. A process according to claim 1, wherein as the impregnation agent a mixture is employed, which comprises 70 to 95 weight percent of a mixture of unsatured polyester resin with various molecular weights,
   2 to 8 weight percent of a photo-initiator,
   0.1 to 2 weight percent of an organic peroxide,
   0.1 to 3 weight percent of a thixotropic material and balance additives.

7. A process according to claim 6, wherein the polyester resin is an allylether resin.

8. A process according to claim 6, wherein as the photo initiator a UV initiator is employed, in particular selected from the group consisting of acylphosphinoxides, ketals, hydroxyketones, aminoketones and mixtures thereof.

9. A process according to claim 6, wherein the thixotropic agent is $SiO_2$.

10. A process according to claim 1, wherein the cover sheet of veneer is bleached in an aqueous bleach bath preferably with overpressure at a temperature of 105 to 115° C. prior to dye treatment.

11. A process according to claim 10, wherein a bleach bath with a hydrogen peroxide concentration of 0.5 to 5 weight percent is employed.

12. A process according to claim 10, wherein a sodium or calcium hydrochloride, sodium peroxide therein sodium bisulphate containing bleach bath is employed.

13. A process according to claim 1, wherein as the coloring component of the dye bath a positive effect stain is employed in a concentration of 3 to 15 weight percent.

14. A process according to claim 1, wherein the intermediate veneer is thoroughly dyed with a dark, preferably black, color.

15. A process according to claim 1, wherein the intermediate layer is provided on one side with a wet adhesive layer.

16. A process according to claim 1, wherein the wet adhesive layer is roller applied or coated upon the veneer surface.

17. A process according to claim 16, wherein the wet adhesive layer is rolled or coated on in an amount of 30 to g/m².

18. A process according to one of claim 1, wherein the wet adhesive layer is dried at room temperature or an elevated temperature up to 40° C.

19. A process according to claim 1, wherein the wet adhesive layer in the course of the mold press process is melted at a temperature above 70° C. and activated at a temperature above 120° C.

20. A process according to claim 1, wherein the wet adhesive mixture contains at least one compound selected from the group consisting of thermally activatable polyacrylate, vinyl resin and polyurethane combinations.

21. A process according to claim 20, wherein the wet adhesive mixture contains additives based in phenolic resin or resorcinol resin.

22. A process according to claim 1, wherein the cover sheet of veneer on the side of the impregnation layer is provided with a removeable protective sheet, preferably of polypropylene, which is pulled off following the mold press process.

23. A process according to claim 1, wherein prior to the mold press process at least one metal sheet, preferably of aluminum, is introduced into two adjacent veneers and bonded to them during the mold press process.

* * * * *